April 21, 1925. 1,534,914
A. CACCIAGATTI
GRAPPLES FOR SPEARING FISH
Filed July 29, 1924 2 Sheets-Sheet 2
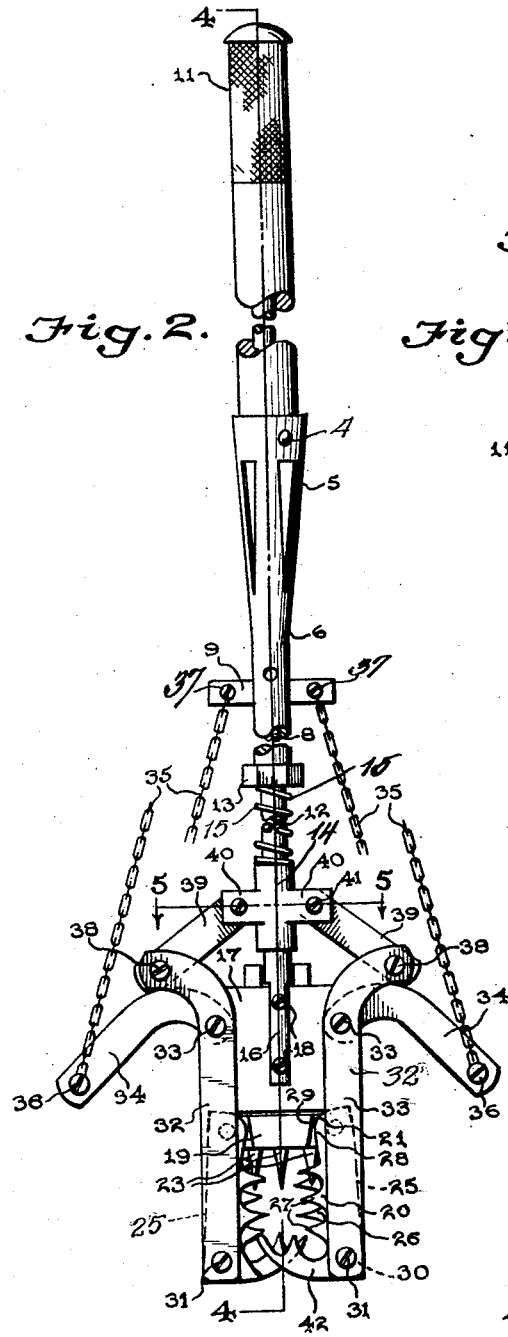
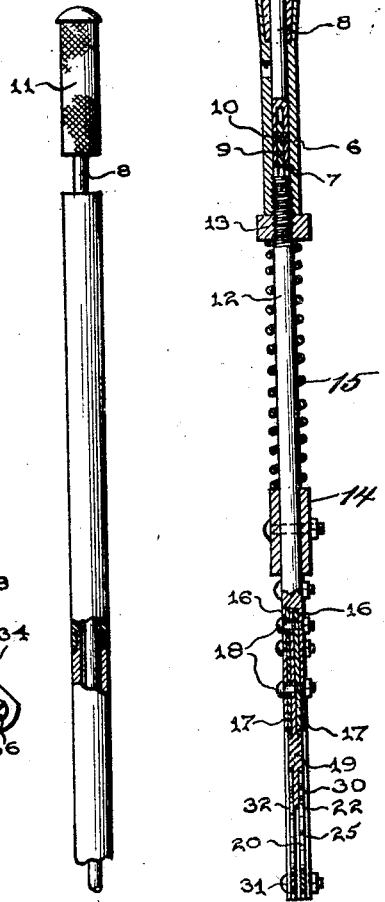
Inventor
Andrew Cacciagatti
By [signature]
Attorney Patented Apr. 21, 1925.

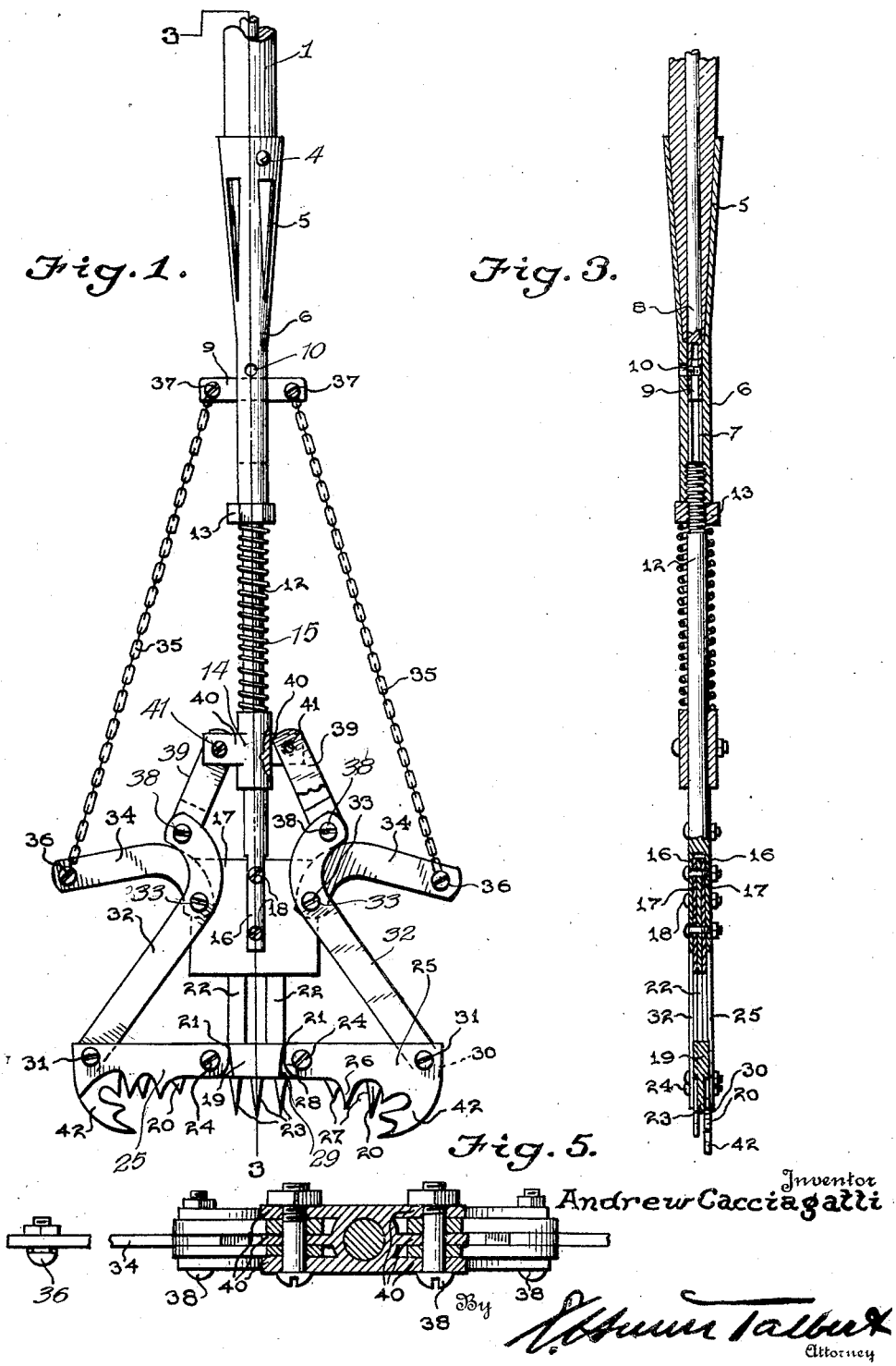

1,534,914

UNITED STATES PATENT OFFICE.

ANDREW CACCIAGATTI, OF PORT JERVIS, NEW YORK.

GRAPPLES FOR SPEARING FISH.

Application filed July 29, 1924. Serial No. 728,945.

*To all whom it may concern:*

Be it known that ANDREW CACCIAGATTI, a citizen of the United States, residing at Port Jervis, in the county of Orange and State of New York, has invented certain useful Improvements in Grapples for Spearing Fish, of which the following is a specification, reference being had therein to the accompanying drawing.

It is the purpose of the present invention to provide, in a grapple for spearing fish, a construction consisting of a plurality of spearing members, together with opposed grappling claws, in conjunction with a handle including a frame in which said claws are mounted, with means for setting the claws so that, in using the grapple or spear, the claw end of the spear may be brought in contact with the fish for actuating the claws inwardly toward the fish, thereby securely grappling the fish and holding the same.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of the improved grapple constructed in accordance with the invention and illustrating the claws open.

Figure 2 is a elevational view showing the claws closed, in fact, in the positions as if the claws were piercing a fish.

Figure 3 is a longitudinal sectional view on line 3—3 of Figure 1.

Figure 4 is a longitudinal sectional view on line 4—4 of Figure 2.

Figure 5 is a sectional view on line 5—5 of Figure 2, transversely thereof, parts broken away.

Figure 6 is an elevation showing the grapple and illustrating the entire handle.

Referring to the drawings, the handle member 1 is engaged in a socket 5 of a body member 6. This body member has a longitudinal slot 7 and slidable in the sectional tubular handle is a rod 8 to which is fixed a cross-piece 9 which operates in the slot 7.

The cross-piece 9 is secured to the rod 8 by means of a screw 10, there being an opening in the wall of the body to permit the insertion of the screw in place to hold the cross-piece in position. The rod 8 reciprocates through the sections of the handle, and secured to the upper end of the rod is a hand-piece 11 which is knurled in order to insure a firm grip of the hand therewith in order to slide the rod. Threaded to the body 6 into its lower end is a rod 12, there being a lock nut 13 to prevent displacement of the rod. The lock nut binds against the end of the body 6 to insure a rigid position of the rod.

A slide 14 is mounted upon the rod 12 and interposed between one end of the slide and the lock nut 13 is a coil spring 15 against the action of which the slide may be moved on the rod 12. The lower end of the rod 12 is provided with two adjacent slots or bifurcations 16 in which two spaced plates 17 are mounted, there being bolts 18 for the purpose of holding the plates in position, spaced as shown, especially in Figures 3 and 4.

The grappling device proper comprises the spear member 19 and the claws 20. The spear member consists of a plate with lateral ears 21 and spaced guide arms 22 and the piercing members 23. The latter extend from one edge of the plate of the spear member. The guide arms 22 are spaced a distance equal to the central piece which separates the slots or bifurcations 16, so that the spear member may be guided in its movement between the two plates 17.

The claws 20 consist of spaced plates 25 which are pivoted at 24 to the ears 21. The edges of these spaced plates 25 of the claws 20 have piercing points 26 and 27 which are staggered and act, when the claws 20 are closed, to pierce the body of a fish. The claws 20 have shoulders 28 which abut shoulders 29 of the body of the spear member, so as to limit the claws 20 in horizontal positions, when open. The plates 25 of the claws 20 are spaced a distance equal to the thickness of the ears 21 and between the outer ends of the plates of the claws 20 suitable washers or disks 30 are interposed, there being bolts 31 passing through the outer ends of the claws to hold the plates 25 in position.

Suitable levers 32 are pivoted by means of bolts 33 to the spaced plates 17. Each lever consists of two parts, one adjacent each remote face of the plates 17. Pivoted between the plates 17 upon the bolts 33 are lever actuating links 34 to which actuating chains 35 are connected, as at 36. The chains 35 are, in turn, connected at 37 to the ends of the cross-piece 9 so that, when the rod 8 is moved by grasping the handle proper 11, the actuating links 34 will be tilted upon the bolts 33.

The upper portions of the levers 32 are curved outwardly in opposite directions and are, in turn, pivoted by means of bolts 38 to links 39. These links are arranged in pairs on opposite sides of the diametrically disposed ears 40 which project laterally from the slide 14 and are pivoted to the ears by means of bolts 41. The actuating links, as shown in Figure 2, are also curved adjacent their pivoted ends and the edges of these curved portions bear on the ends of the links 39, as shown in Figure 2 wherein the claws are closed and the spear member receded.

In order to open the claws and to extend the spear member, the handle proper 11 is pulled so as to move the rod 8 through the handle and thereby actuate the slide 9. The slide 9, in turn, pulls upon the chains 35 which, in turn, pull upon the actuating links 34, the curved portions of the links 34 camming on the end edges of the links 39, thereby causing the lower ends of the levers 32 to spread in diverging positions as in Figure 1. The act of these levers spreading opens the claws 20 and cause the spear member 19 to be extended until the claws 20 assume horizontal positions, as in Figure 1.

When the grapple for spearing fish is operated, the grapple is moved with the piercing points of the claws 20 directed toward the fish. As soon as the claws come in contact with the body of the fish, they automatically close to the positions shown in Figure 2, the piercing points of the claws entering the body of the fish and holding the same firmly. In order to release the fish and thereby reset the claws, the handle proper 11 may be pulled again which will tension on the chains 35 and open the claws.

The ends of the claws 20 which are pivoted on the bolts 31 have auxiliary claws 42. In other words, only one of the plates 25 of each claw 20 has an auxiliary claw 42 in order that the claws 42 may overlap when the claws 20 are closed.

The invention having been set forth, what is claimed is:

1. A fish grapple comprising a frame with a rod connected thereto and terminating in a handle, a slide on the rod, a sliding spear member mounted in guides of the frame, grappling claws pivotally connected to the spear member and adapted to close when the spear member recedes in the frame, levers operatively mounted on the frame and connected to the claws and, in turn, operatively connected to the slide, and means operatively mounted on the handle and operatively connecting with the levers for actuating the same to open the claws and extend the spear member.

2. In a fish grapple, the combination with a frame including an extension terminating in a handle, of a movable device slidable on the extension, grappling members operatively mounted on the frame, levers pivotally connected to the frame and, in turn, operatively connected to certain of the grappling members, links connecting the levers to the slide, and means operatively mounted on the frame and camming against the ends of the links for actuating the levers and opening the grappling members.

3. In a fish grapple, the combination with a frame provided with an extension having a handle, of a slide movable on the extension, grappling members operatively mounted on the frame, levers pivoted to the frame and provided with curved portions adjacent their pivots, links connecting the extremities of the curved portions and the slide, and actuating links operatively pivoted on the frame and having curved parts camming upon the first links whereby, upon operating the actuating links in directions toward the handle, the grappling members may open.

4. In a fish grapple, the combination with a frame including an extension terminating in a handle, of a movable device slidable on the extension, grappling members operatively mounted on the frame, levers pivotally connected to the frame and, in turn, operatively connected to certain of the grappling members, links connecting the levers to the slide, means operatively mounted on the frame and camming against the ends of the links for actuating the levers and opening the grappling members, and manually operated means mounted on the handle and connected to the last named means for operating the same.

5. In a fish grapple, the combination with a frame provided with an extension having a handle, of a slide movable on the extension, grappling members operatively mounted on the frame, levers pivoted to the frame and provided with curved portions adjacent their pivots, links connecting the extremities of the curved portions and the slide, actuating links operatively pivoted on the frame and having curved parts camming upon the first links whereby, upon operating the actuating links in directions toward the handle, the grappling members may open, and manually operated means on the handle for pulling the actuating links in directions toward the handle.

6. In a fish grapple, the combination with a frame, of a spear member provided with extension piercing points mounted for extension movement in guides of the frame, claws pivotally and operatively mounted on the spear member and adapted to lie in parallel positions when closed and provided with piercing points to overlie the piercing points of the spear member, and means operatively connecting with the free ends of the claws for opening them, thereby extending the spear member.

7. In a fish grapple, the combination with a frame, of a spear member provided with extension piercing points mounted for extension movement in guides of the frame, claws pivotally and operatively mounted on the spear member and adapted to lie in parallel positions when closed and provided with piercing points to overlie the piercing points of the spear member, and means operatively connecting with the free ends of the claws for opening them, thereby extending the spear member, the spear member and the pivoted ends of the claws having adjacent shoulders to engage, when the claws are opened, to limit the claws in horizontal positions.

In testimony whereof he affixes his signature.

ANDREW CACCIAGATTI.